US007322027B2

(12) United States Patent
Tousignant (10) Patent No.: US 7,322,027 B2
(45) Date of Patent: Jan. 22, 2008

(54) DETECTING TERMINATION AND PROVIDING INFORMATION RELATED TO TERMINATION OF A COMPUTER SYSTEM PROCESS

(75) Inventor: Patrick Tousignant, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 10/611,450

(22) Filed: Jun. 30, 2003

(65) Prior Publication Data

US 2004/0268319 A1    Dec. 30, 2004

(51) Int. Cl.
*G06F 9/44* (2006.01)
*G06F 15/00* (2006.01)

(52) U.S. Cl. .................. 717/127; 717/124; 712/231; 712/234; 712/244

(58) Field of Classification Search ............... None
See application file for complete search history.

(56) References Cited

U.S. PATENT DOCUMENTS

| 5,522,036 | A | * | 5/1996 | Shapiro ................. 714/38 |
| 5,787,245 | A | * | 7/1998 | You et al. ............... 714/38 |
| 6,071,317 | A | * | 6/2000 | Nagel .................... 717/128 |
| 7,039,738 | B2 | * | 5/2006 | Plummer et al. ....... 710/260 |
| 7,047,521 | B2 | * | 5/2006 | Bunnell ................. 717/130 |
| 7,058,928 | B2 | * | 6/2006 | Wygodny et al. ...... 717/128 |
| 2003/0204374 | A1 | * | 10/2003 | Madsen et al. ......... 702/186 |

OTHER PUBLICATIONS

Blazer, Robert, et al., "Mediating Connectors: A Non-ByPassable Process Wrapping Technology", Proceedings of the 19th IEEE International Conference on Distributed Computing Systems Workshop, pp. 73-77, Austin, TX, Jun. 1999.
Hunt, Galen, et al., "Detours: Interception of Win32 Functions", Proceedings of the 3rd USENIX Windows NT Symposium, Seattle, WA, Jul. 12-13, 1999.
Keller, Ralph, et al., "Binary Component Adaption", EXOOP 1998, Object-Oriented Programming, 12th European Conference, pp. 307-29.
Ziya, Aral, et al., "Efficient Debugging Primitives for Multiprocessors", Proceedings of the third International Conference on Architectural Support for Programming Languages and Operating Systems, pp. 87-95, Boston, MA, Apr. 1989.

(Continued)

*Primary Examiner*—Chuck Kendall
(74) *Attorney, Agent, or Firm*—Workman Nydegger (57) ABSTRACT

The present invention extends to mechanisms for detecting termination and providing information related to termination of a computer system process. A computer system loads a termination function (e.g., an abort, exit, or terminate function) into system memory. The termination function includes termination instructions that, when executed, cause a calling process to terminate without providing information related to a termination event that caused the calling process to terminate. In memory, the functionality of the memory resident termination function is redirected to a memory resident invalid instruction that, when executed, causes an exception providing termination information related to a termination event (e.g., the exception is propagated to an operating system code layer). A memory resident process detects a termination event and the memory resident program calls the termination function. The computer system redirects the call from the memory resident termination function to the memory resident detour function.

30 Claims, 3 Drawing Sheets

OTHER PUBLICATIONS

Hunt, Galen, et al., "The Coign Automatic Distributed Partioning System", Proceedings of the Third Symposium on Operating Systems Design and Implementation [OSDI '99], pp. 187-200, New Orleans, LA, Feb. 1999 Usenix.

Hunt, Galen, et al., "Intercepting and Instrumenting COM Applications", Proceedings of the Fifth Usenix Conference on Object-Oriented Technologies and Systems [COOTS '99], pp. 45-56, San Diego, CA, May. 1999.

Kessler, Peter, "Fast Breakpoints: Design and Implementation", Proceedings of the ACM SIGPLAN 90 Conference on Programming Language Design and Implementation, pp. 78-84, White Plains, NY, Jun. 1990.

Larus, James R., et al., "EEL; Machine-Independent Executable Editing", Proceedings of the ACM SIGPLAN Conference on Programming Language Design and Implementation, pp. 291-300, La Jolla, CA, Jun. 1995.

Li, Li, et al., "High-Performance Distributed Objects over a System Area Network", Proceedings of the Third USENIX NT Symposium, pp. 21-30, Seattle, WA, Jul. 1999pp.

Romer, Ted, et al., "Instrumentation and Optimization of Win32/Intel Executables Using Etch", Proceedings of the USENIX Windows NT Workshop 1997, pp. 1-7, Seattle, WA, Aug. 1997.

Srivastava, Amitabh, et al., "ATOM: A System for Building Customized Program Analysis Tools", Proceedings of the SIGPLAN '94 Conference on Programming language Design and Implementation, pp. 196-205, Orlando, FL, Jun. 1994.

Stets, Robert J., et al., "Component-based Operating System APIs: A Versioning and Distributed Resource Solution", IEEE Computer, 32[7], pp. 54-61, Jul. 1999.

Tamches, Ariel, et al., "Fine-Grained Dynamic Instrumentation of Commodity Operating System Kernels", Proceedings of the Third Symposium on Operating Systems Design and Implementation [OSDI 99], pp. 117-130, New Orleans, LA, Feb. 1999.

Zhang, Xiaolan, et al., "System Support for Automated Profiling and Optimization", Proceedings of the sixteenth ACM Symposium on Operating System Principles, pp. 15-26, Saint-Malo, France, Oct. 1997.

* cited by examiner

DETECTING TERMINATION AND PROVIDING INFORMATION RELATED TO TERMINATION OF A COMPUTER SYSTEM PROCESS

BACKGROUND OF THE INVENTION

1. The Field of the Invention

The present invention relates to managing processes on a computer system. More specifically, the present invention relates to mechanisms for detecting termination and providing information related to termination of a computer system process.

2. Background and Related Art

Computers have revolutionized the way we work and play. There are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding error, this will often result in a deviation from expected functionality.

Extraordinary efforts are currently in place to reduce the number of unexpected performance deviations in many software programs before and after the software application are shipped to market. However, the creativity of software programmers and designers has led to increasingly complex and powerful software applications. As the complexity of the software application increases, so often does the number of lines of source code needed to generate the software application. In a software application with increased lines of source code, there is a corresponding increase in the potential for introducing instructions that will cause a software application to deviate from expected performance. Further, there is always some potential for the instructions of a software application to cause the software application to terminate without providing any information related to the cause of the termination (hereinafter referred to as "undetected termination").

Undetected termination of a software application can occur when the software application includes a default behavior for handling otherwise unhandled exceptions generated by the software application. Deviation from expected performance at run-time (e.g., due to execution of an invalid instruction) can cause an error, often referred to as an "exception". When a code layer that caused an exception does not include instructions for handling the exception, the exception can be propagated to other code layers until instructions for handling the exception are located. For example, a software application may execute an invalid instruction that attempts to write data to memory address zero. Since computer systems typically do not allow access to memory address zero, execution of the invalid instruction results in an access violation exception. If the software application does not include appropriate instructions for handling the access violation exception, the access violation exception can be referred to as an "unhandled" exception (i.e., the software application does not handle the access violation exception) and can be propagated to an operating system code layer.

When the operating system code layer receives an unhandled exception, the operating system code layer can handle the unhandled exception by launching a debugger or crash monitor that provides information related to the unhandled exception. For example, a debugger or crash monitor can provide register values, a memory dump, and/or an event log that represent the state of the computer system at the time the unhandled exception occurred. This is beneficial as a developer or user of the software application is provided information that may be useful in determining the cause of the unhandled expectation. Unfortunately, it may be difficult for a software application that caused an unhandled expectation to recover and resume executing instructions. For example, the software application may freeze and there may be not way to return execution back to the software application.

Accordingly, software developers can include instructions for catching and handling exceptions a software application might generate or otherwise encounter. Many software applications are designed to catch at least common exceptions and appropriately handle the common exceptions in a manner that allows the software application to continue functioning. Unfortunately, some software developers may lack the desire and/or knowledge to implement instructions that check for all possible handles exceptions a software application might generate or otherwise encounter. On the other hand, more conscientious software developers may include substantial error checking and exception handling code, in an attempt to handle all possible exceptions an application program might generate or otherwise encounter. However, there is always some potential for even a conscientious software developer to develop a software application that lacks appropriate instructions for handling at least some exceptions.

Thus, during the execution of a software application there is always a possibility that an exception will go unhandled by exception handling mechanisms expressly included in the software application. As a result, some compilers insert code into software applications that handle exceptions in a default manner when the exceptions are not otherwise handled by expressly included exception handling mechanisms. For example, it may be that a software application developed in C++ source code does not include instructions for catching and handling C++ exceptions. Thus, when the software application generates a C++ exception, the C++ exception is handled in the default manner. The default manner can include returning execution to a "main" function that attempts to handle the exception. If the main function cannot handle the exception, the main function calls an "exit" function causing the software application to terminate. That is, the main function handles the C++ exception by terminating the software application.

Since the main function handles the C++ exception, the C++ exception is not propagated to other code layers. Thus, there is limited, if any, chance for an operating system code layer to detect the C++ exception as an unhandled exception. Accordingly, the operating system code layer does not invoke a debugger or crash monitor and the software application is terminated without providing information related to the cause of the termination.

Undetected termination of a software application can also occur when the software application includes a default behavior for handling appropriate input. For example, a software application may include a conversion function that converts a text representation of message length (e.g., in bytes) to a positive integer. However, the developer of the software application may have failed to consider the possibility of receiving a negative message length and thus may simply pass a negative message length to the conversion function. The conversion function's behavior upon receiving a negative message length may be to call an exit function, which terminates the software application. Thus, if the conversion function was called with a message length of negative one, the conversion function would cause the software application to terminate. However, little, if any, information related to the termination would be provided to a user or developer of the software application.

Although a developer could potentially re-code the conversion function, the developer may lack access to the source code (e.g., in C++, C#, or Visual Basic) for a software application. Instead, the software developer may have access only to machine and/or object instructions (e.g., an executable program or dynamic link library ("DLL")) generated as a result of compiling the source code. Thus, even if a developer has the desire, ability, and appropriate tools for re-coding a function to provide information related to the termination of a software application, the developer may nonetheless be prevented from implementing the functionality.

When a software application is executed, one or more process may be loaded into system memory. Many processes are loaded into system memory to perform automated tasks that do not require user-input to function. For example, a loaded process can monitor ports of a computer system for incoming electronic messages. Many operating systems (as well as other software systems) include the functionality to display a "task list" of processes that are loaded in memory. For example, in some Microsoft® Windows® environments, a computer system user or administrator can activate a key combination of the "Ctrl", "Alt", and "Delete" keys to display a task list. Thus, a user or administrator can view processes (even some background processes) running on a corresponding computer system.

Unfortunately, due to default exception handling and/or the default behavior of a function, undetected termination of memory resident processes can occur. That is, termination of the process can occur without an error message being presented at the computer system (either from the terminating process or the operating system). Thus, a user or administrator may become aware that the terminated process is no longer running only after actions typically performed by the process (e.g., automatically checking for electronic mail messages) do not occur. Accordingly, what would be advantageous are mechanisms for detecting termination and providing information related to termination of a computer system process.

BRIEF SUMMARY OF THE INVENTION

The foregoing problems with the prior state of the art are overcome by the principles of the present invention, which are directed towards systems, methods, and computer program products for detecting termination and providing information related to termination of a computer system process. A computer system includes system memory (e.g., Random Access Memory ("RAM")) and a storage location (e.g., a magnetic hard disk). The computer system loads a termination function, such as, for example, an abort, exit, or terminate function, into system memory. The memory resident termination function includes termination instructions that, when executed, cause a calling process to terminate without providing information related to a termination event that caused the calling process to terminate.

The computer system redirects the functionality of the memory resident termination function to a memory resident detour function. Functionality of the memory resident termination function is redirected such that when the memory resident termination function is called, instructions of the memory resident detour function are executed. The memory resident detour function includes an invalid instruction that, when executed, causes an exception. The invalid instruction may cause an exception having an increased likelihood of being propagated to another code layer (e.g., to an operating system code layer). Through redirection of a memory resident termination function, the functionality of an application program can be altered without having to recompile the application program and/or the termination function. Accordingly, a developer may be able to alter the functionality of a memory resident termination function even if the developer lacks access to the source code for the application program and/or the termination function. For example, the developer can alter the functionality of an "exit" function to cause an exception having an increased chance of propagating to an operating system code layer.

A memory resident process detects a termination event, such as, for example, a main function receiving a C++ exception that can not be handled or a function receiving invalid input. Accordingly, the memory resident process calls the memory resident termination function in an attempt to terminate the memory resident process. The computer system redirects the call from the memory resident termination function to the memory resident detour function. The computer system executes the invalid instruction included in the detour function to generate an exception. The invalid instruction can generate an exception that has an increased chance of being propagated to another code layer. For example, the invalid instruction can be an instruction that causes an access violation by attempting to write data to memory address zero.

Accordingly, the generated exception can be received at another code layer, for example, an operating system code layer, as an unhandled exception (i.e., an exception that was not handled at an application code layer). It may be that the unhandled exception is caught by an unhandled exception catcher at the operating system code layer. In response, the unhandled exception catcher can invoke a debugger or crash monitor that gathers termination information (e.g., register values, memory dumps, and event logs) related to the memory resident process. Thus, through redirection to a detour function, termination information, that would otherwise not be gathered, can be used to determine the cause of process termination.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program product for detecting termination and providing information related to termination of a computer system process. A computer system loads a termination function, such as, for example, an abort, exit, or terminate function, into system memory such that the termination function become memory resident. The memory resident termination function includes termination instructions that, when executed, cause a calling process to terminate without providing information related to a termination event that caused the calling process to terminate. The computer system redirects the functionality of the memory resident termination function to a memory resident detour function such that when the memory resident termination function is called, instructions of the memory resident detour function are executed. The memory resident detour function includes an invalid instruction that, when executed, causes an exception that can be used to provide termination information related to a termination event that caused the process to terminate.

A memory resident process (e.g., the application process) detects a termination event (e.g., handling a C++ exception according to compiler provided default behavior) and the memory resident process calls the termination function. The computer system redirects the call from the memory resident termination function to the memory resident detour function. Accordingly, the computer system executes the invalid instruction to generate an exception. For example, the computer system may execute an instruction that causes an access violation by attempting to write data to memory address zero.

Embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced with many types of computer system configurations, including, personal computers, laptop computers, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

Figure 1:
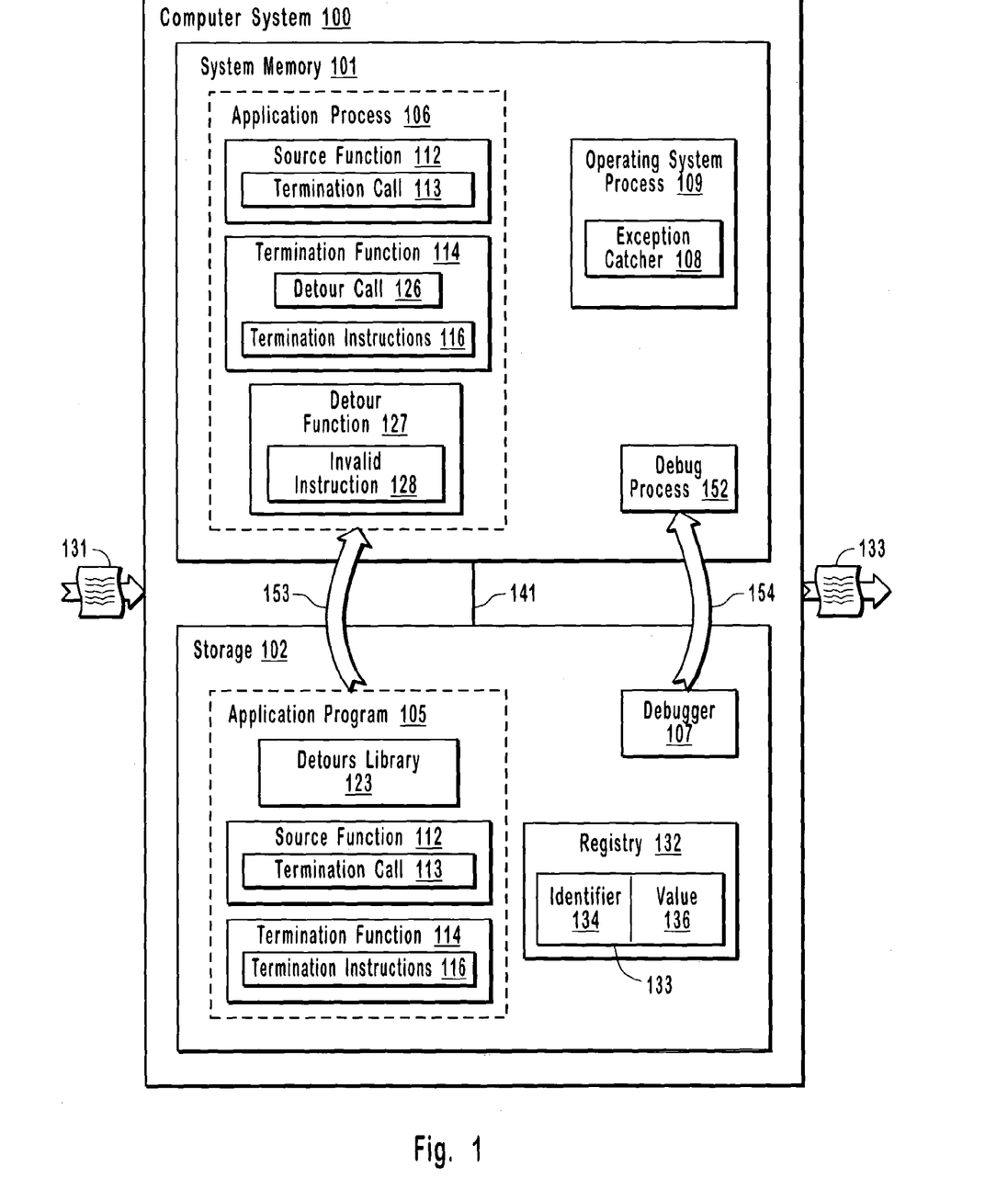
FIG. 1 illustrates an example of computer system architecture and associated modules and data structures for detecting termination and providing information related to termination of a computer system process in accordance with the principles of the present invention.

Turning now to FIG. 1, FIG. 1 illustrates an example of a computer system architecture 100 and associated modules and data structures detecting termination and providing information related to termination of a computer system process. The rectangular elements in computer system architecture 100 (e.g., operating system process 109, exception catcher 108, detour function 127, and debugger 107) represent executable modules that facilitate detecting termination and providing information related to termination of a computer system process (e.g., application process 106). The scrolled elements (e.g., input 131 and termination information 133) represent data that is processed by the executable modules to detect termination and provide information related to termination of a computer system process. Accordingly, the executable modules and scrolled elements depicted in computer system architecture 100 cooperatively interact to implement the principles of the present invention.

Computer system architecture 100 can receive input (e.g., input 13 1) that causes the execution of application programs (e.g., application program 105) stored at a storage device (e.g., storage 102). Executed application programs can cause application processes to be loaded into system memory (e.g., system memory 101). For example, as illustrated by arrow 153, computer system architecture 100 can receive input 131 causing application program 106 to load into system memory 101. Input 131 can be user-input (e.g., received at a keyboard or mouse) or can be input from another computer system (e.g., a computer system that is network connectable to computer system architecture 100). Storage 102 and system memory 101 can exchanged information over link 141, which can be a portion of a system bus, a portion of a local area network ("LAN"), and/or a portion of a Wide Area Network ("WAN").

Input 131 can include manually entered input and/or automatically generated input. For example, manually entered input at computer system architecture 100 (or a network connectable computer system) can cause execution of an application program at computer system architecture 100. On the other hand, computer system architecture 100 (or some other network connectable computer system) can be configured to automatically execute an application program at computer system architecture 100 when a specified event occurs (e.g., at specified intervals, at system startup, etc). Accordingly, when a specified interval occurs, an application program is executed at computer system architecture 100 without user intervention.

Execution of an application program can cause one or more processes to be loaded into system memory. For example, execution of application program 105 can cause application process 106 (and potentially other application processes) to be loaded into system memory 101 (e.g., Random Access Memory). A process loaded into system memory can be referred to as a "memory resident process". Accordingly, application process 106 can be referred to as a memory resident process.

Application program 105 can be an executable program that was compiled from source code. For example, application program 105 may be the result of a C++ compiler compiling C++ source code. Thus, processes spawned from application program 105 may generate C++ exceptions. Application program 105 may also be compiled to include one or more functions that respond to invalid input by attempting to terminate a calling process. For example, source function 112 can include instructions (e.g., termination call 113) that call an exit function in response to receiving improper input, such as, for example, receiving input of an improper data type (e.g., receiving a negative value for a length).

Application program 105 can be compiled to include detours library 123, which enables in memory redirection of functions called by application program 105. When an application including detours library 123 is loaded, the application can check a registry to determine if in memory redirection is active. For example, when application process 106 is loaded, application process 106 can check registry 132. Registry 132 can include one or more registry entries, such as, for example, registry entry 133. Registry entries can include name/value pairs. For example, registry entry 133 includes identifier 134 that identifies registry entry 133 and a corresponding value 136 representing a value for registry entry 133.

Registry entry 133 can be an entry that indicates whether or not in memory redirection is active. For example, identifier 134 may be a "CrashOnUnexpectedExit" key that indicates registry entry 133 is the registry entry to check to determine if in memory redirection is active. Value 136 can be a corresponding value set, for example, to "On or "Active" when in memory redirection is active and set, for example, to "Off" or "Inactive" when in memory redirection is not active. An administrator or user of computer system architecture 100 can utilize a registry access module to appropriately set value 136. When in memory redirection is active, an application process can redirect a call that would otherwise go to a target function to a detour function.

Source function 112 can be a module or subroutine that is called to execute a portion of the functionality of application process 106. Source function 112 can include default catch instructions that prevent specified exceptions (e.g., exceptions that may not be appropriately handled by legacy debuggers) from being propagated to other code layers. When source function 112 detects one of these specified exceptions, source function 112 can execute termination call 113 that causes execution to jump to termination function 114. Accordingly, in response to one of the specified exceptions, termination instructions 116 are executed to terminate application process 106 (the calling process). Termination instructions 116 can be instructions that terminate application process 106 without providing any termination information (e.g., register values, memory dumps, events logs, etc.) related to the specified exception that caused application process 106 to terminate.

Operating system process 109 can monitor for otherwise unhandled exceptions at an operating system code layer. When an application program that caused an exception does not handle the exception, the otherwise unhandled exception can be propagated to other code layers, including the operating system code layer. When an otherwise unhandled exception is detected at the operating system code layer, operating system module 109 can invoke exception catcher 108 (e.g., a user-configured unhandled exception catcher) to attempt to handle the exception. In response to detecting an otherwise unhandled exception, exception catcher 108 can invoke a debugger or crash monitor.

For example, exception catcher 108 can execute debugger 107 causing debug process 152 to load into system memory 101. Debug process 152 can be a debug or a crash monitor process that is configured to gather termination information (e.g., register values, memory dumps, events logs, etc.) related to an otherwise unhandled exception and/or termination of a memory resident process. Debug process 152 can present gathered termination information at an output device and/or store termination information (e.g., at storage 102) for subsequent presentation at an output device. For example, debug process 152 can send termination information 133 to a computer display device and/or a log file.

As depicted in FIG. 1, detour function 127 is included in application process 106. Detour function 127 includes invalid instruction 128 that, when executed, results in an exception. The resulting exception can be an exception that has an increased likelihood of being propagated to the operating system code layer (e.g., an exception resulting from an attempt to write to memory address zero). Accordingly, in response to the execution of exception instruction 128, exception catcher 108 (or a module in communication with operating system module 109) can load debug process 152 into system memory 101.

Figure 2:
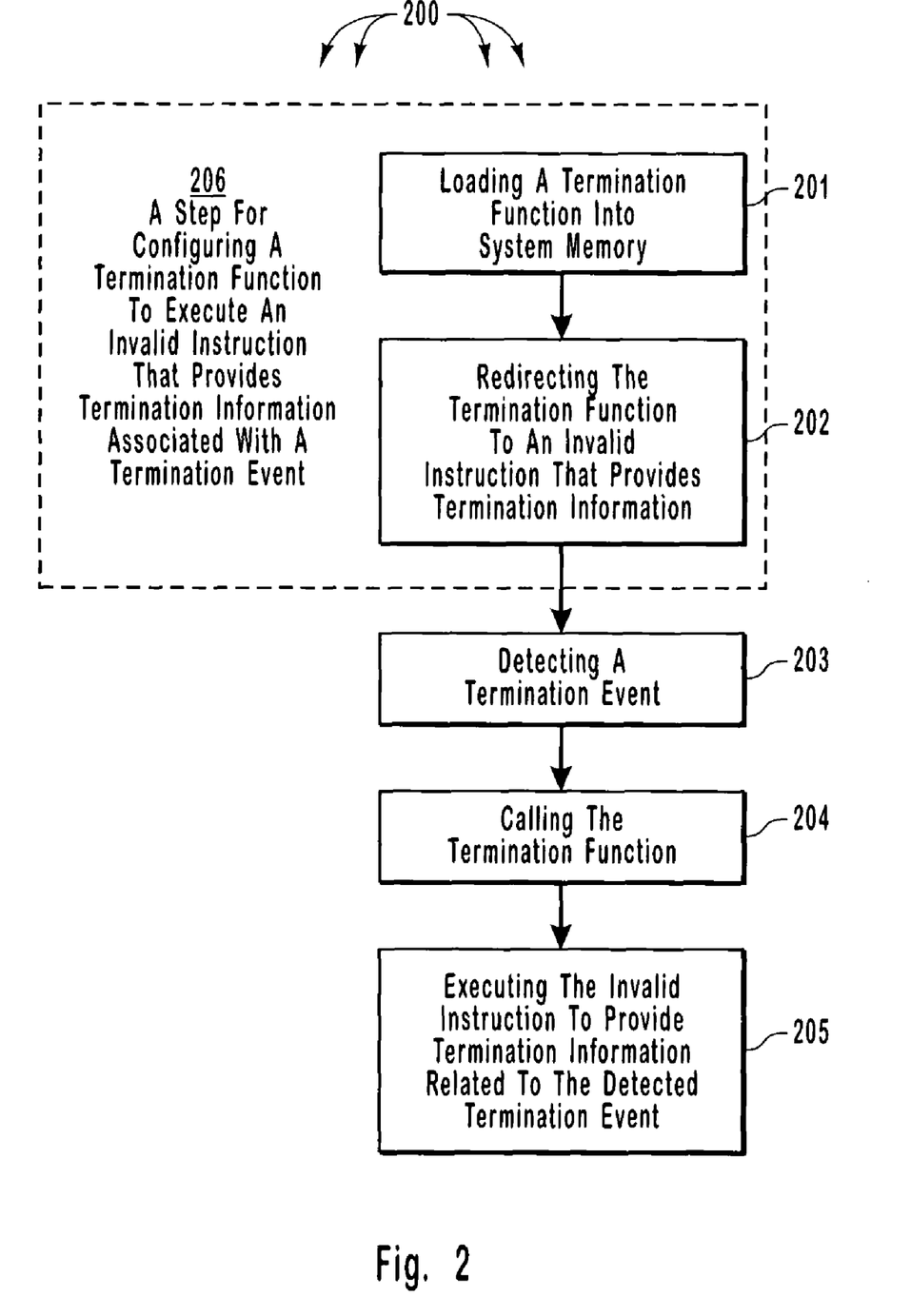
FIG. 2 illustrates a flowchart of a method for detecting termination and providing information related to termination of a computer system process in accordance with the principles of the present invention.

FIG. 2 illustrates a flowchart of a method 200 for detecting termination and providing information related to termination of a computer system process. The method 200 will be discussed with respect to the executable modules and data structures depicted in computer system architecture 100. The method 200 includes a functional result oriented step for configuring a termination function to execute an exception instruction that provides termination information associated with a termination event (step 206). Step 206 can include any corresponding acts for configuring a termination function to execute an invalid instruction that provides termination information associated with a termination event.

Step 206 can include a corresponding act of altering source code such that a termination event (e.g., an exception caught by a compiler included default exception catcher) causes the invalid instruction to be executed. When a developer has access to the source code for a termination function, the developer can alter the source code to create a customized termination function that includes the invalid instruction. Alternately, when the developer has access to source code for an application program that calls the termination function, the developer may be able to replace the call to the termination function with a call to a detour function that includes the invalid instruction. For example, a developer with access to appropriate source code (e.g., compiler source code that includes a default exception catcher in an application program,) can alter termination function 114 and/or application program 105 to include an appropriate invalid instruction (e.g., invalid instruction 128). Accordingly, source code can be altered such that there is an increased chance of detecting and providing termination information related to a termination event and/or the termination of processes spawned from the application program 105.

Step 206 can also include a corresponding act of altering binary code such that a termination event (e.g., an exception caught by a default exception catcher) causes the invalid instruction to be executed. When a developer has access to the binary code for a termination function, the developer can alter the binary code to create a customized termination function that includes the invalid instruction. Alternately, when the developer has access to binary code for an application program that calls the termination function, the developer can replace the call to the termination function with a call to a detour function that includes the invalid instruction. For example, a developer with access to appropriate binary code can alter termination function 114 and/or application program 105 to include an appropriate invalid instruction (e.g., exception instruction 128). Accordingly, binary code can be altered such that there is an increased chance of detecting and providing termination information related to a termination event and/or the termination of processes spawned from the application program 105.

Step 206 can also include a corresponding act of altering entries in a source library to point to a detour library. For example, a developer with access to a source Dynamic Link Library ("DLL") can alter import entries in the source DLL to redirect calls to the source DLL to a detour DLL that includes the invalid instruction. Redirection to the detour DLL can include replacing the name of the source DLL in an import table before the source DLL is loaded into system memory or replacing entries in a jump table after the source DLL is loaded into system memory. Accordingly, libraries can be redirected such that there is an increased chance of detecting and providing termination information related to a termination event and/or the termination of processes spawned from the application program 105.

However, in the method illustrated in FIG. 2, step 206 includes a corresponding act of loading a termination function into system memory (act 206). Act 206 can include a computer system loading a termination function having termination instructions that, when executed, cause a calling process to terminate without providing information related to a termination event (e.g., default behavior calling an exit function) that caused the calling process to terminate. For example, computer system architecture 100 can load application process 106, which includes termination function 114, into system memory 101. Termination function 114 includes termination instructions 116, which, when executed, cause application process 106 to terminate but do not provide information related to the termination of application process 106. Termination function 114 can be any of a wide variety of termination functions, such as, for example, terminate, abort, exit, _exit, _cexit, _c_exit, _amsg_exit, and ExitProcess functions, called as a last resort when a situation (e.g., an exception or an in valid input value) is not otherwise appropriately handled.

In the method illustrated in FIG. 2, step 206 includes a corresponding act of redirecting the termination function to an invalid instruction that provides termination information (act 202). Act 202 can include a computer system redirecting the functionality of the termination function to a memory resident detour function such that when the termination function is called, instructions of the detour function are executed. The detour function can include an invalid instruction that, when executed, causes an exception that can be used to provide termination information related to a termination event that otherwise cause a calling process to terminate. For example, when in memory redirection is active, computer system 101 can execute detour call 126 to redirect (e.g., through a jump instruction) the functionality of termination function 114 (e.g., an exit function) to detour function 127 (e.g., that includes instructions for causing an access violation). Detour call 126 can be included at or near the beginning of termination function 114 such that execution is redirected to detour function 127 before termination instructions 116 are executed. Accordingly, when source function 112 executes termination call 113, execution can be redirected (through detour call 126) to detour function 127.

Method 200 includes an act of a memory resident process detecting a termination event (act 203). Act 203 can include a memory resident process at a computer system detecting a termination event. A termination event can be an exception or other event that has a decreased likelihood of being propagated to other software layers resident in system memory 101. For example, a termination event can be an exception that is processed by default compiler included instructions (e.g., instructions that prevent propagation of a C++ exception) or a call to termination function as a result of invalid input to a function.

During execution of source function 112, application process 106 can detect a termination event that is to terminate application process 106. For example, application process 106 may detect a C++ exception that is processed by default compiler included behavior in a main function. It may be that a legacy debugger (such as debugger 107) can not appropriately handle C++ exceptions and the default compiler included behavior thus prevents propagation of C++ exceptions Method 200 includes an act of the memory resident process calling the termination function (act 204). Act 204 can include a memory resident process at a computer system calling the termination function. For example, in response to the detected termination event, source function 112 can execute termination call 113 to call termination function 114. During execution of termination function 114, detour call 126 can be executed and detour function 127 called. Accordingly, execution is redirected (within system memory 101) from termination function 114 to detour function 127.

Method 200 includes an act of executing the invalid instruction to provide termination information related to the detected termination event (act 205). Act 205 can include a computer system executing the invalid instruction to provide termination information related to the detected termination event, in response to the termination function being called. For example, during execution of detour function 127, computer system architecture 100 can execute invalid instruction 128. Executing invalid instruction 128 (e.g., attempting to write data to memory address zero) can generated an exception that has an increased likelihood of being propagated to other code layers, such as, for example, to an operating system code layer monitor by operating system process 109.

Accordingly, exception catcher 108 can detect an exception resulting from execution of invalid instruction 128. Exception catcher 108 can cause debug process 152 (e.g., a debugger or crash monitor process) to launch. For example, in response to the execution of invalid instruction 128, exception catcher 108 (or some other operating system process in communication with operating system process 109) can execute debugger 107. As illustrated by arrow 154, execution of debugger 107 can cause debug process 152 to be loaded in to system memory 101. Execution of an invalid instruction can also cause termination information to be gathered by a debug process. For example, debug process 152 can gather termination information (e.g., register values, memory dumps, and event logs) related to the termination of application process 106.

Debug process 152 can transfer gathered termination information for presentation at an output device and/or can store gathered termination information for later presentation. For example, computer system architecture 100 can transfer termination information 133 to a computer monitor. Accordingly, a memory resident termination function can be redirected to a memory resident detour function. This increases the chances of detecting and providing termination information related to a termination event and/or the termination of processes. For example, termination information can be provided even when a C++ exception or invalid input to a function would otherwise result in undetected process termination.

It may also be that in memory redirection is at some time deactivated. For example, a user or administrator can set value 136 to "off" or "inactive". Accordingly, during execution of a termination function detour calls are bypassed. For example, when in memory redirection is inactive, calls to termination function 114 result in the execution of termination instructions 116 (since detour call 126 is bypassed). Thus, in memory redirection can be reconfigured without having to reload a process in to system memory. For example, when in memory redirection is active, detour call 126 is executed. On the other hand, when in memory redirection is inactive, detour call 126 is bypassed.

In memory redirection can be in inactivated as part of the normal termination of a memory resident process. This significantly reduces the possibility of normal termination (e.g., in response to user or administrator commands) causing an inappropriate call to a detour function.

Figure 3:
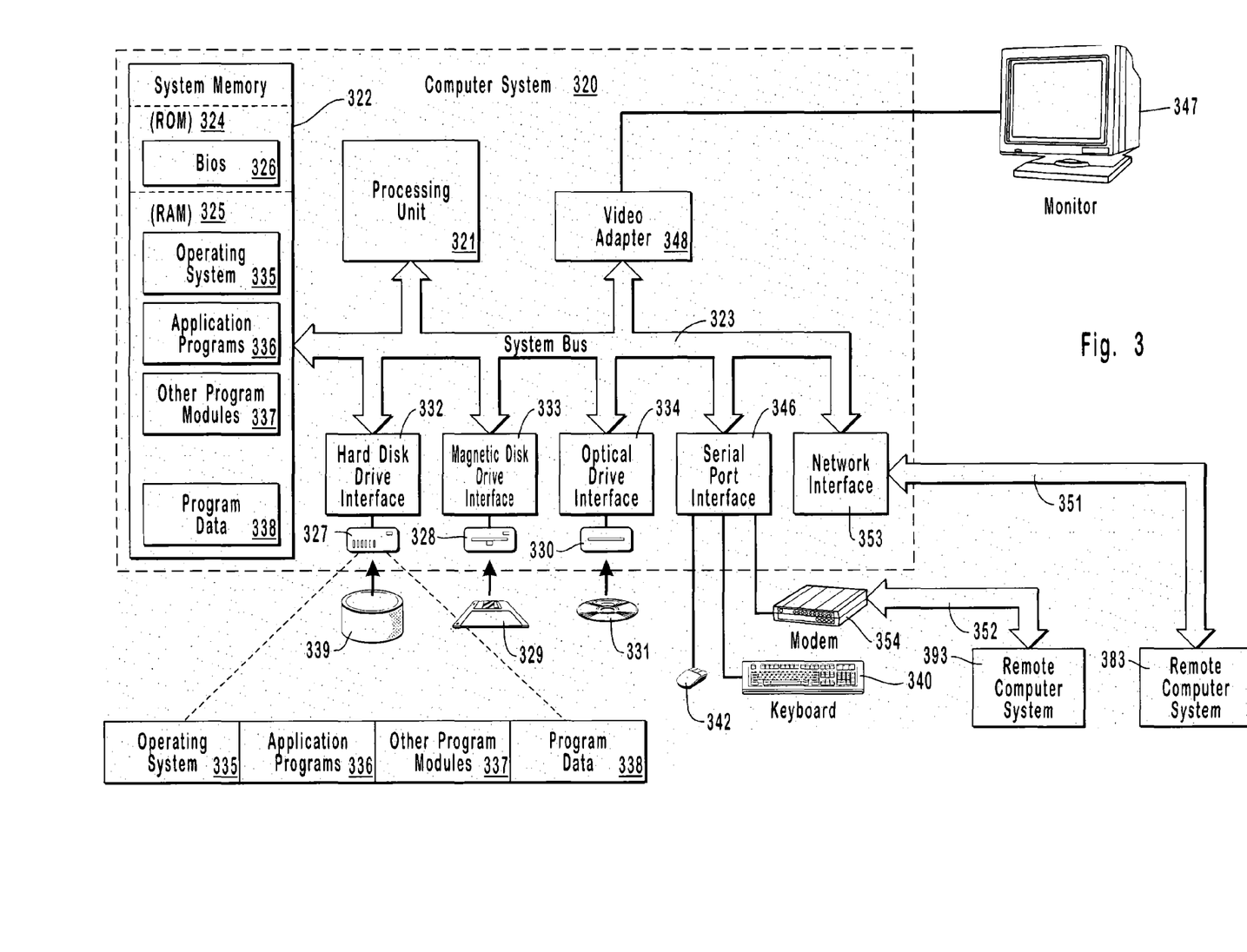
FIG. 3 illustrates a suitable operating environment for the principles of the present invention.

FIG. 3 illustrates a suitable operating environment for the principles of the present invention. FIG. 3 and the following discussion are intended to provide a brief, general description of a suitable computing environment in which the invention may be implemented. With reference to FIG. 3, an example system for implementing the invention includes a general-purpose computing device in the form of computer system 320.

Computer system 320 includes a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within the computer 320, such as during start-up, may be stored in ROM 324.

The computer system 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331, such as, or example, a CD-ROM or other optical media. The magnetic hard disk drive 327, magnetic disk drive 328, and optical disk drive 530 are connected to the system bus 323 by hard disk drive interface 352, magnetic disk drive-interface 333, and optical drive interface 334, respectively. The drives and their associated computer-readable media provide nonvolatile storage of computer-executable instructions, data structures, program modules, and other data for computer system 320. Although the example environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer system 320 through keyboard 340, pointing device 342, or other input devices (not shown), such as, for example, a microphone, joy stick, game pad, scanner, or the like. These and other input devices can be connected to the processing unit 321 through serial port interface 346 coupled to system bus 323. Alternatively, input devices can be connected by other interfaces, such as, for example, a parallel port, a game port, a universal serial bus ("USB") port, or a Fire Wire port. A monitor 347 or other display device is also connected to system bus 323 via video adapter 348. Computer system 320 can also be connected to other peripheral output devices (not shown), such as, for example, speakers and printers.

Computer system 320 is connectable to networks, such as, for example, an office-wide or enterprise-wide computer network, an intranet, and/or the Internet. Computer system 320 can exchange data with external sources, such as, for example, remote computer systems, remote applications, and/or remote databases over such a network.

Computer system 320 includes network interface 353, through which computer system 320 receives data from external sources and/or transmits data to external sources. As depicted in FIG. 3, network interface 353 facilitates the exchange of data with remote computer system 383 via link 351. Link 351 represents a portion of a network, and remote computer system 383 represents a node of the network.

Likewise, computer system 320 includes serial port interface 346, through which computer system 320 receives data from external sources and/or transmits data to external sources. Serial port interface 346 is coupled to modem 354, through which computer system 320 receives data from and/or transmits data to external sources. Alternately, modem 354 can be a Data Over Cable Service Interface Specification ("DOCSIS") modem or digital subscriber lines ("DSL") modem that is connected to computer system 320 through an appropriate interface. However, as depicted in FIG. 3, serial port interface 346 and modem 354 facilitate the exchange of data with remote computer system 393 via link 352. Link 352 represents a portion of a network, and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

Modules of the present invention, as well as associated data, can be stored and accessed from any of the computer-readable media associated with computer system 320. For example, portions of such modules and portions of associated program data may be included in operating system 335, application programs 336, program modules 337 and/or program data 338, for storage in system memory 322. When a mass storage device, such as, for example, magnetic hard disk 339, is coupled to computer system 320, such modules and associated program data may also be stored in the mass storage device. In a networked environment, program modules and associated data depicted relative to computer system 320, or portions thereof, can be stored in remote memory storage devices, such as, for example, system memory and/or mass storage devices associated with remote computer system 383 and/or remote computer system 393. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired secured by United States Letters Patent is:

1. In a computer system including system memory, a method for providing information related to the termination of a process, the method comprising:
   an act of loading a termination function into system memory, the termination function having termination instructions that, when executed, cause a calling process to terminate without providing information related to a termination event that caused the calling process to terminate;
   an act of altering the code of the termination function to redirect the functionality of the termination function to a memory resident invalid instruction such that a termination event causes the invalid instruction to be executed, execution of the invalid instruction causing an exception that provides termination information related to the termination event;
   an act of a memory resident process detecting a termination event;
   an act of the memory resident process calling the termination function; and
   an act of executing the invalid instruction to provide termination information related to the detected termination event, in response to the termination function being called.

2. The method as recited in claim 1, wherein the act of loading a termination function into system memory comprises an act loading an application process into system memory.

3. The method as recited in claim 1, wherein the act of loading a termination function into system memory comprises an act loading termination function wherein the termination function is a terminate function, an abort function, an exit function, an _exit function, a_cexit function, a_c_exit function, an_amsg_exit function, or an ExitProcess function.

4. The method as recited in claim 1, wherein the act of loading a termination function into system memory comprises an act loading a termination function in response to user input.

5. The method as recited in claim 1, wherein the act of altering the code of the termination function to redirect the functionality of the termination function to a memory resident invalid instruction comprises an act of activating in memory redirection.

6. The method as recited in claim 1, wherein the act of altering the code of the termination function to redirect the functionality of the termination function to an invalid instruction comprises an act of redirecting the termination function to an invalid instruction that can cause an exception having an increased likelihood of being propagated to an operating system code layer.

7. The method as recited in claim 6, wherein the act of altering the code of the termination function to redirect the termination function to an invalid instruction that can cause an exception having an increased likelihood of being propagated to an operating system code layer comprises an act of redirecting the termination function to an instruction that attempts to write data to memory address zero.

8. The method as recited in claim 6, wherein the act of altering the code of the termination function to redirect the termination function to an invalid instruction that can cause an exception having an increased likelihood of being propagated to an operating system code layer comprises an act of redirecting the termination function to an instruction that causes an access violation.

9. The method as recited in claim 1, wherein the act of a memory resident process detecting a termination event comprises an act of memory resident process detecting a C++ exception that was generated by the memory resident process, the C++ exception being an exception that cannot be appropriately handled by a debugger.

10. The method as recited in claim 1, wherein an act of executing the invalid instruction to provide termination information related to the detected termination comprises an act of generating an exception that has an increased chance of being propagated to an operating system code layer.

11. The method as recited in claim 1, wherein an act of executing the invalid instruction to provide termination information related to the detected termination event comprises executing an instruction that attempts to write data to memory address zero.

12. The method as recited in claim 1, wherein an act of executing the invalid instruction to provide termination information related to the detected termination event comprises an act of providing termination information wherein the termination is one or more of register values, a memory dump, and an event log.

13. The method as recited in claim 1, wherein an act of executing the invalid instruction to provide termination information comprises an act of an exception catcher catching an unhandled exception generated by the invalid instruction.

14. The method as recited in claim 1, wherein an act of executing the invalid instruction to provide termination information comprises an act of invoking a debug process that gathers termination information.

15. The method as recited in claim 1, further comprising an act of activating in memory redirection in a system registry.

16. In a computer system including system memory, a method for providing information related to the termination of a process, the method comprising:
   a step for configuring a termination function to execute an invalid instruction that provides termination information associated with a termination event, configuring the termination function including altering code such that a termination event causes the invalid instruction to be executed;
   an act of a memory resident process detecting a termination event;
   an act of the memory resident process calling the termination function; and
   an act of executing the invalid instruction to provide termination information related to the detected termination event, in response to the termination function being called.

17. The method as recited in claim 16, wherein the step for configuring a termination function to execute an invalid instruction that provides termination information comprises a corresponding act of altering source code such that a termination event causes the invalid instruction to be executed.

18. The method as recited in claim 16, wherein the step for configuring a termination function to execute an invalid instruction that provides termination information comprises a corresponding act of altering binary code such that a termination event causes the invalid instruction to be executed.

19. The method as recited in claim 16, wherein the step for configuring a termination function to execute an exception instruction that provides termination information comprises a corresponding act of redirecting a library such that a termination event causes the exception instruction to be executed.

20. The method as recited in claim 19, wherein the corresponding act of redirecting a library such that a termination event causes the invalid instruction to be executed comprises an act of redirecting a dynamic link library.

21. A computer program product for use in a computer system including system memory, the computer program product for implementing a method for providing information related to the termination of a process, the computer program product comprising one or more computer-readable media having stored thereon computer executable instructions that, when executed by a processor, cause the computer system to perform the following:
   load a termination function into system memory, the termination function having termination instructions that, when executed, cause a calling process to terminate without providing information related to a termination event that caused the calling process to terminate;
   alter the code of the termination function to redirect the functionality of the termination function to a memory resident invalid instruction such that a termination event causes the invalid instruction to be executed, execution of the invalid instruction causing an exception that provides termination information related to the termination event;
   detect a termination event;
   call the termination function; and
   execute the invalid instruction to provide termination information related to the detected termination event, in response to the termination function being called.

22. The computer program product as recited in claim 21, wherein computer-executable instructions that, when executed, cause the computer system to load a termination function into system memory comprise computer-executable instructions that, when executed, cause the computer system to load a termination function wherein the termination function is a termination function, an abort function, an exit function, an_exit function, a_cexit function, a_c_exit function, an_amsg_exit function, or an ExitProcess function.

23. The computer program product as recited in claim 21, wherein computer-executable instructions that, when executed, cause the computer system to alter the code of the termination function to redirect the functionality of the termination function to a memory resident invalid instruction comprise computer-executable instructions that, when executed, cause the computer system to insert a detour call into the termination function, the detour call calling the invalid instruction.

24. The computer program product as recited in claim 21, wherein computer-executable instructions that, when executed, cause the computer system to alter the code of the termination function to redirect the functionality of the termination function to a memory resident invalid instruction comprise computer-executable instructions that, when executed, cause the computer system alter the code of the termination function to redirect the functionality of the termination function to a memory resident instruction that attempts to write data to memory address zero.

25. The computer program product as recited in claim 21, wherein computer-executable instructions that, when executed, cause the computer system to alter the code of the termination function to redirect the functionality of the termination function to an invalid instruction comprise computer-executable instructions that, when executed, cause the computer system alter the code of the termination function to redirect the functionality of the termination function to a memory resident instruction that causes an access violation.

26. The computer program product as recited in claim 21, wherein computer-executable instructions that, when executed, cause the computer system to execute the invalid instruction to provide termination information related to the detected termination event comprise computer-executable instructions, that when, executed cause the computer system to execute an instruction that causes an access violation.

27. The computer program product as recited in claim 21, wherein computer-executable instructions that, when executed, cause the computer system to execute the invalid instruction to provide termination information related to the detected termination event comprise computer-executable instructions that, when executed, cause an exception having an increased chance of being propagated to an operating system code layer.

28. The computer program product as recited in claim 21, wherein computer-executable instructions that, when executed, cause the computer system to execute the invalid instruction to provide termination information related to the detected termination event comprise computer-executable instructions, that when, executed cause the computer system to provide termination information wherein the termination information is one or more of register values, a memory dump, and an event log.

29. The computer program product as recited in claim 21, wherein computer-executable instructions that, when executed, cause the computer system to execute the invalid instruction to provide termination information related to the detected termination event comprise computer-executable instructions that, when executed, cause a debug process to gather termination information.

30. The computer program product as recited in claim 21, wherein the one or more computer-readable media comprise physical storage media.

* * * * *